United States Patent
Watts, Jr. et al.

(10) Patent No.: US 6,735,663 B2
(45) Date of Patent: May 11, 2004

(54) COMBINATION PERSONAL DATA ASSISTANT AND PERSONAL COMPUTING DEVICE

(75) Inventors: La Vaughn F. Watts, Jr., Austin, TX (US); Ronald D. Shaw, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 522 days.

(21) Appl. No.: 09/740,138

(22) Filed: Dec. 18, 2000

(65) Prior Publication Data

US 2003/0188077 A1 Oct. 2, 2003

(51) Int. Cl.⁷ .............................. G06F 13/20
(52) U.S. Cl. .................. 710/313; 710/305; 710/306; 710/316; 710/317; 710/38
(58) Field of Search .................. 710/306, 305, 710/313, 316, 317, 38

(56) References Cited

U.S. PATENT DOCUMENTS

| | | | | |
|---|---|---|---|---|
| 5,499,377 A | * | 3/1996 | Lee ........................... 709/244 |
| 5,590,338 A | | 12/1996 | Parks et al. ................ 395/742 |
| 5,608,884 A | | 3/1997 | Potter ......................... 395/309 |
| 5,742,794 A | | 4/1998 | Potter ......................... 395/500 |
| 5,835,750 A | | 11/1998 | Pan-Ratzlaff .............. 395/500 |
| 5,999,997 A | * | 12/1999 | Pipes .......................... 710/303 |
| 6,035,345 A | * | 3/2000 | Lee ................................ 710/8 |
| 6,044,452 A | * | 3/2000 | Birch et al. ................... 712/28 |
| 6,134,167 A | * | 10/2000 | Atkinson ..................... 365/222 |
| 6,138,191 A | * | 10/2000 | Fujii et al. .................... 710/73 |
| 6,144,976 A | * | 11/2000 | Silva et al. .................. 708/100 |
| 6,279,063 B1 | * | 8/2001 | Kawasaki et al. .......... 710/110 |
| 6,308,239 B1 | * | 10/2001 | Osakada et al. ............ 710/316 |
| 6,473,789 B1 | * | 10/2002 | Chen et al. ................. 709/213 |
| 6,532,512 B1 | * | 3/2003 | Torii et al. .................. 710/316 |
| 6,578,140 B1 | * | 6/2003 | Policard ......................... 713/1 |
| 2001/0030850 A1 | * | 10/2001 | Ditzik ......................... 361/683 |

FOREIGN PATENT DOCUMENTS

EP          703522 A2  *  3/1996  ............. G06F/1/16

OTHER PUBLICATIONS

"Intel 820 Chipset: A Revolutionary Architecture for Mainstream Performance PCs in 2000," 1999, Intel Corporation, p. 1–10.*
Roberts, C.E., "A RISC Processor for Embedded Applications within an ASIC," Oct. 1991, IEEE Micro, vol. 11, Issue 5, p. 20–23, 68–72.*
"Controller," Dec. 2, 2002, Webopedia, p. 1 <available at www.webopedia.com>.*
Tyler, Benjamen G., and Mark Larson, "System and Method for Handling Interrupts in a Multi–Processor Computer," Dell USA, L.P.

* cited by examiner

Primary Examiner—Xuan M. Thai
Assistant Examiner—Donna K. Mason
(74) Attorney, Agent, or Firm—Haynes and Boone, LLP

(57) ABSTRACT

In order to overcome the relatively short battery life and the relatively long delay between the activation and the actual functioning of a typical mobile computing system, the mobile computing system is provided with a personal computer (PC) architecture system and a personal digital assistant (PDA) architecture system, and a common display and shared peripherals. Interfacing to the systems is a super input output or embedded controller (SIO/EC) that acts as a slave device to whatever system has control of computing system. The SIO/EC controls a quick switch which blocks or allows communication along communication busses connecting the systems to the SIO/EC. A user can selectively change, by way of a user interface to the SIO/EC, to whatever system that is desired by the user.

21 Claims, 4 Drawing Sheets

COMBINATION PERSONAL DATA ASSISTANT AND PERSONAL COMPUTING DEVICE

BACKGROUND

This disclosure relates generally to a computing system, and more particularly to a mobile computing system integrating dissimilar systems within a system. In general, mobile computing systems provide either specialized functionality and relatively long interval between battery charges, or the mobile computing systems provide full range functionality with relatively short battery charge lifetime. In addition, the mobile computing system with specialized functionality is available for user interaction immediately upon activation of the system.

There are currently two popular types of mobile computing systems. The mobile Personal Computer (PC) system is a fully functional data processing system, typically having the same functionality as a desktop PC or a workstation PC. The mobile PC system is typically referred to as a notebook or laptop computer. The mobile PC system type runs under any number of standard operating systems, such as one of the releases of Windows® by the Microsoft Corporation. In implementing the mobile PC in a mobile computing system, several relatively undesirable features are apparent. First, the batteries of the portable mobile PC device must be recharged after a relatively short time, typically, in the order of a few hours. Despite improvements in battery technology, the quest for lighter and more compact portable units have tended to reduce the space allocated to the batteries so that time between charging of the batteries has not been significantly improved. The batteries used in the portable mobile PC devices, however, are capable of relatively rapid charging. As with the desktop PC unit and the workstation PC from which they are derived, the operating system needed for the mobile PC system requires a relatively long time from the activation of the power switch to the time when the processing system is available for actual computation. The mobile PC systems, however, have remarkable flexibility and can provide processing capability of extraordinary power.

More recently the personal digital assistant (PDA) system has been developed to take advantage of operating systems (OS) such as Palm® OS and Windows® CE. These operating systems, in conjunction with a PDA system, permit a reduced or specialized functionality computing system.

Typically, these PDAs are relatively small and can perform a variety of useful functions such as arrange calendars; schedule appointments; send and receive e-mail; provide presentations; create documents; and provide communications. The PDA operating systems can permit exchange of files between the PDA systems and a mobile PC system with Microsoft Windows® files. While the reduced functionality can be a disadvantage of the PDA system, this system has several advantages. An advantage is the time between charging of the batteries can be greatly extended, a result of the reduced functionality and the absence of disk storage units. A PDA system has considerable flexibility with respect to expansion. However, as the system is expanded, the power requirements increase, and the battery charging cycle is decreased. The time for charging the batteries, at least on the presently available PDA systems, requires a relatively long period. Another advantage is the PDA system has the memory loaded in the memory circuit, such as a flash memory, as contrasted with a disk drive for the mobile PC devices. Compare this process to the time of activation for a mobile PC. For reasons related to testing, to flexibility and to backward compatibility, a relatively large amount of time elapses between the activation of a mobile PC device and when the device is functional. In contrast, the PDA system is fully functional from the time that it is activated.

A need has been felt for a mobile computing system having the desirable features of both the mobile PC systems and of the PDA systems. In particular, the mobile computing system would have the feature of an expanded time between battery charges. Another feature of the mobile computing system would be the availability for performing user-directed processing functions as soon as the power is applied to the processing unit made available by a PDA system. Another feature of the portable processing unit would be the capability of performing essentially all of the processing functions available to the full-function PC system. Still another feature would be a low-power, reduced functionality mode of operation and an increased power, full functionality mode of operation. Yet another feature of the portable data processing system would be the ability to control mode of operation, i.e., a low power, reduced-functionality mode or a high power, full-function mode of operation.

SUMMARY

The aforementioned and other features are accomplished, according to the present disclosure, by providing a mobile computing system that includes a PC system and a PDA system which can share common resources within the mobile computing system and a communication bus.

For applications not requiring the full functionality of the mobile PC system, a user can select the PDA system in conjunction with a common display and shared peripheral devices, providing a reduced power mode operation of the computing system. When expanded functionality is required of the computing system, the mobile PC system is activated or given control. The user has selectable control over whether the PC system or the PDA is activated.

The user has the option of transferring control of the common display and control of the shared peripheral devices. During power-up, the PDA system, common display and shared peripheral devices are automatically activated, thereby providing an instant-on function. The user, however, has the option as to how to configure the data processing system default parameters.

The user enters a command as to which system is to have control over the common resources. The PC system or PDA system processes this command and initiate transfer of the common display and shared peripheral devices to the other system. When the PDA system is given control, the communication bus to the PC system is blocked, allowing the PDA system control over the shared peripherals. The PDA is also given control over the common display device. The PDA system contains individual memory storage, including memory related to start-up instructions.

While the PDA system is in control, the PC system operates in one of several restricted modes. Some of these modes include a power off state where all PC system only devices are powered down, a suspend state where the PC system does not execute and has a limited number of devices in a low power mode, or full power but cripled state where the shared resources and the PDA system are not available to the PC system.

When the PC system is given control, the PDA system becomes a slave resource of the PC system and the PC system is given control over the shared peripheral devices.

The PC system is also given control over the common display device. The PC system has individual memory storage which includes start-up instruction code.

Control over which system has control over the shared resources can be done by a shared resource such as an Embedded Controller (EC). The EC acting under direction of either the PC system or the PDA system, directs control of the shared peripheral devices to the correct system.

The EC also controls the routing of the shared communication channel to allow the logical, electrical, and/or functional isolation needed for the correct operations of the mobile computing system.

BRIEF DESCRIPTION OF THE DRAWINGS

The present disclosure may be better understood, and its numerous objects, features and advantages made apparent to those skilled in the art by referencing the accompanying drawings.

The use of the same reference symbols in different drawings indicates similar or identical items.

DESCRIPTION OF THE PREFERRED EMBODIMENT(S)

1. Detailed Description of the Drawings

Figure 1:
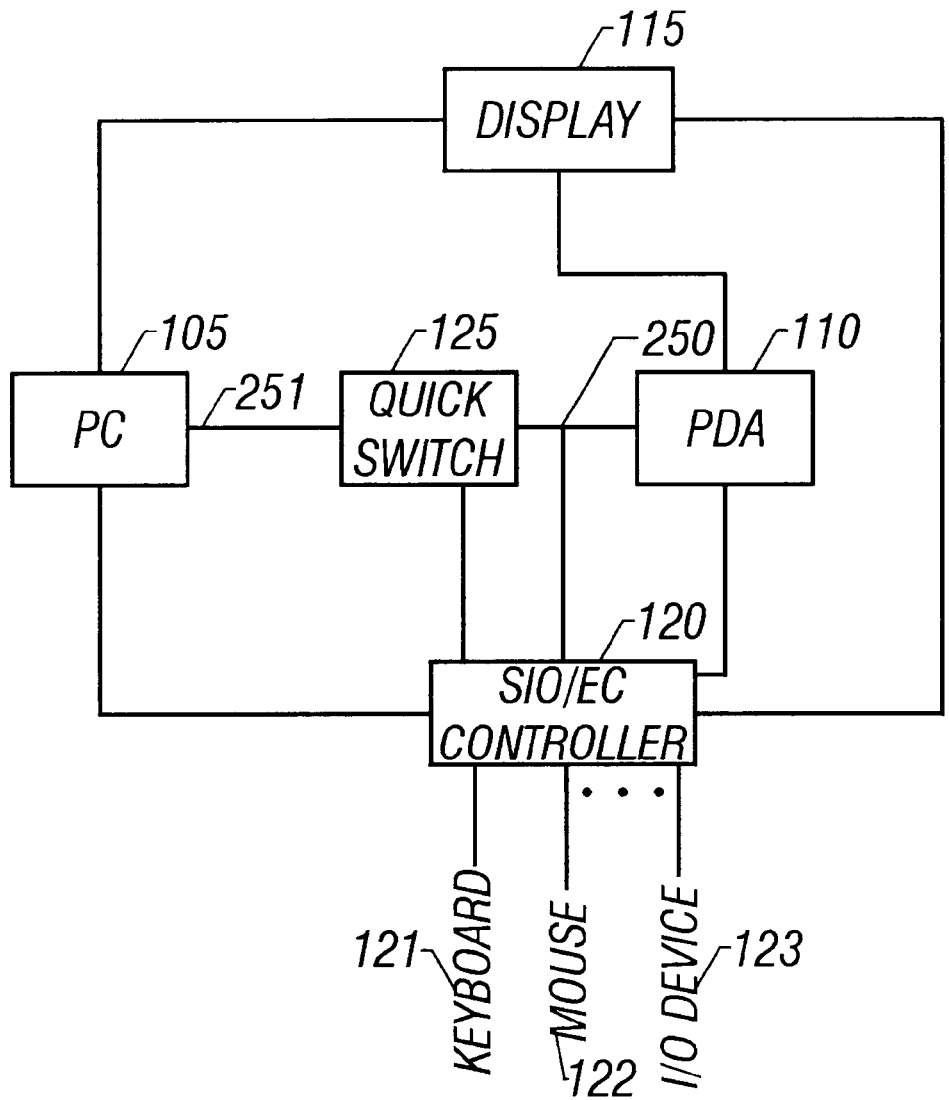
FIG. 1 is a block diagram of the computing system according to the present disclosure.

Now referring to FIG. 1, illustrated is a top-level block diagram of the computing system. The computing system includes a PC system 105 and a PDA system 110. The PC system 105 and the PDA system 110 interface to a super input output controller and embedded controller (SIO/EC) 120. The SIO/EC 120 directs which system controls common system devices, including a common display 115. Common input and output (I/O) devices, such as a keyboard 121, a mouse 122, and various other devices such as I/O device 123 are shared by the PC system 105 and PDA system 110. These common I/O devices interface by individual connections to the SIO/EC 120. A quick switch 125 is controlled by the SIO/EC 120. Quick switch 125 either allows the PC system 105 to communicate to the common devices and PDA system 110 or allows the PDA system 110 to communicate to the common devices.

LPC bus 251 provides the shared communication bus. LPC bus 251 is dedicated to the PC system. The quick switch 125 provides isolation between the LPC bus 250 and the LPC bus 251 when the PDA system accesses the common I/O devices, such as the keyboard 121, the mouse 122, and the I/O device 123.

Figure 2:
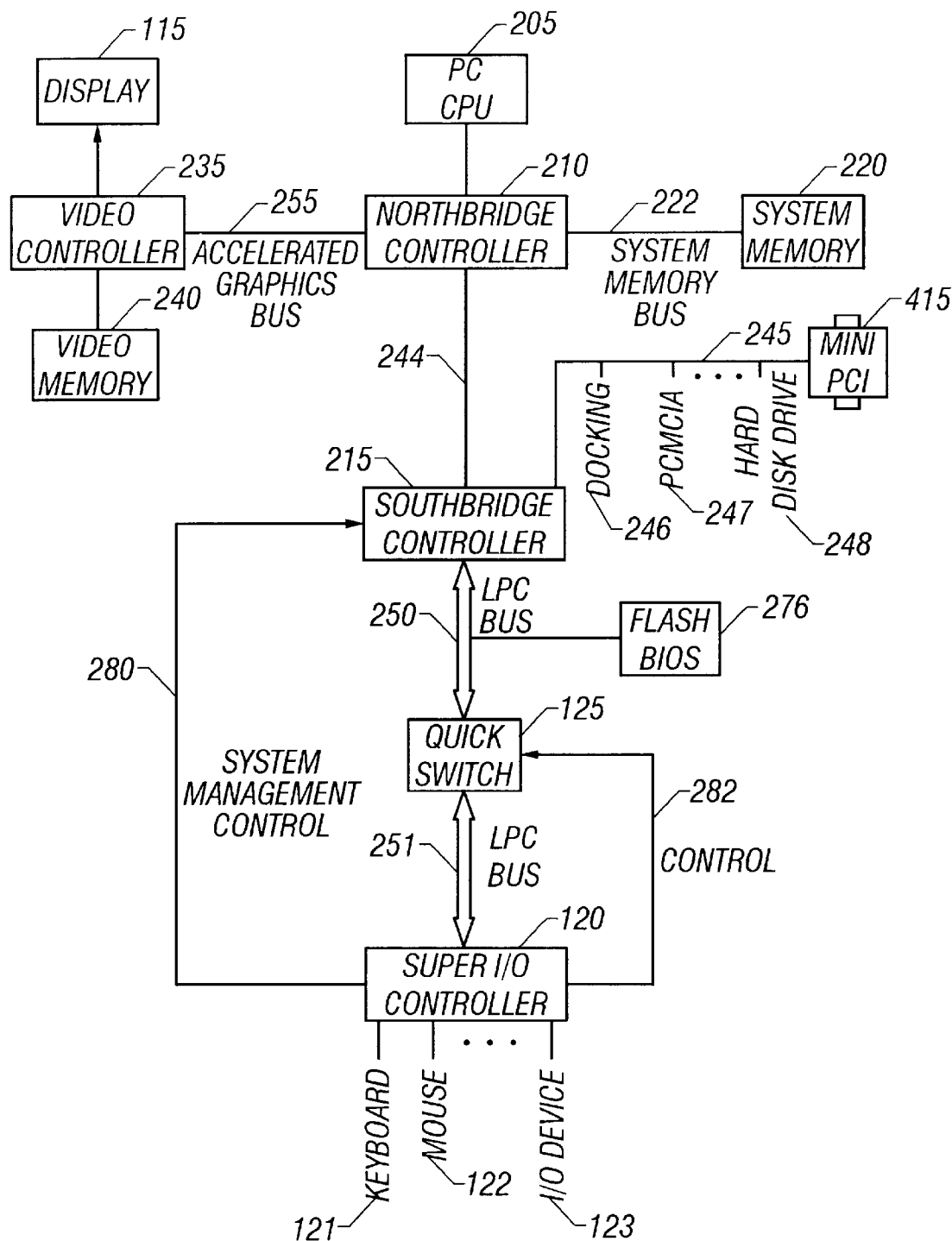
FIG. 2 is a block diagram of the PC system portion of the computing system.

Now referring to FIG. 2 illustrated is a block diagram of the PC system 105. The PC system 105 includes a PC CPU 205. The PC CPU 205 can be one of numerous processors, such as the Pentium® series of processors sold by the Intel Corporation. The CPU 205 interfaces to a north-bridge controller 210. The north-bridge controller 210 interfaces via a system memory bus 222 to a dedicated system memory 220. The system memory 220 is dedicated to the PC system 105 and is not shared with the PDA system 110.

The north-bridge controller 210 interfaces to a video controller 235. In this embodiment an accelerated graphics bus 255 links the north-bridge controller 210 to the video controller 235. The video controller 235 interfaces to a video memory 240. When the PC system 105 has control, the video controller 235 is able to interface to the common display 115.

North-bridge controller 210 interfaces to a data bus 244. From the data bus 244, the north-bridge controller 210 connects to the south-bridge controller 215.

The south-bridge controller 215 interfaces to a peripheral component interface (PCI) bus 245. The PCI bus 245 may extend to interface to various components and devices such as a docking station 246; personal computer memory card international (PCMCIA) card expansion slot (s) or PCMCIA devices 247; other peripheral devices such as peripheral N labeled as 248; and Mini-PCI connector(s) 415.

The south-bridge controller 215 connects to a low pin count (LPC) bus 250. Along the LPC bus 250 is a flash basic input output system (BIOS) 276. The flash BIOS 276 provides the PC system 105 with instruction code, including startup instructions. Information contained on flash BIOS 276 is only directly accessible by the PC System 105.

The LPC bus 250 provides communication to the PC system 105 and common peripheral devices connected to SIO/EC 120. Communication along LPC bus 250 is controlled by the quick switch 125. The quick switch 125 either will block communication to the south-bridge controller 215, if the PDA system 110 is in control, or allows communication to pass if the PC system 105 is in control.

The quick switch 125 connects LPC bus 250 to the SIO/EC 120 via a second bus, LPC Bus 251. The SIO/EC 120 provides a control signal 282 to the quick switch 125. The control signal 282 indicates whether to allow communication from the PC system 105, if the PC system 105 is in control. The SIO/EC 120 in addition provides a system management control signal 280 to the south-bridge controller 215 indicating whether the PC system 105 is in control or not in control.

Figure 3:
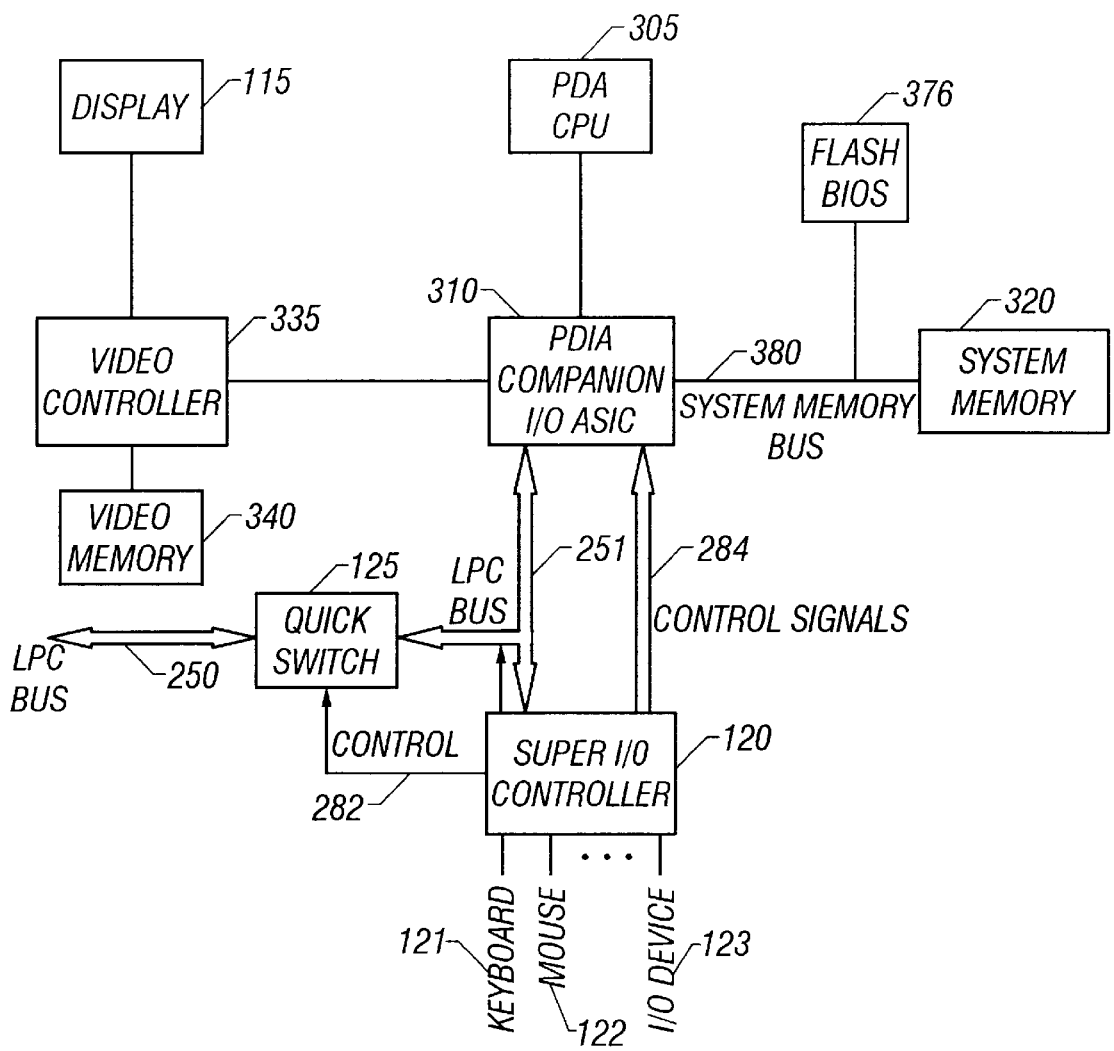
FIG. 3 is a block diagram of the PDA system portion of the computing system.

Now referring to FIG. 3, illustrated is a block diagram of the PDA system 110. The PDA system 110 includes a PDA CPU 305. Possible processors that can be used as the CPU 305 include the "405" series processors sold by the IBM Corporation and the Strongarm® series of processors sold by the Intel Corporation. The PDA CPU 305 interfaces to a PDA companion I/O application specific integrated circuit (ASIC) 310. The companion I/O processor 310 interfaces via a system memory bus 380 to a dedicated system memory 320. A dedicated flash BIOS 376 resides along the system memory bus 380. The flash BIOS 376 and the system memory 320 provide dedicated instruction code, including startup instructions to the PDA system 110.

The companion I/O ASIC 310 interfaces to a video controller 335. The video controller 335 interfaces to a video memory 340. This video controller 335 and video memory comprise the "video section" of the PDA system 105. This "video section" of the PDA system is able to drive the common display 115 in a reduced but fully functional mode. Only when the PDA system 110 has control of the common display 115 is the video controller 335 able to interface to the common display 115.

The companion I/O ASIC 310 connects to the LPC bus 251. The LPC bus 251 provides communication capability to the common I/O devices. The control signal 282 indicates whether the PDA system 110 is in control. Control signals 284 also are provided to the PDA companion I/O processor 310 indicating that control exists with the PDA system 110.

When the computing system is under PDA system 110 control, the quick switch 125 blocks communications from the LPC Bus 250, allowing communication to directly take place between the SIO/EC 120 and the PDA companion I/O processor 310 along the LPC Bus 251. Under PDA system 110 control, the PDA companion I/O ASIC 310 directly communicates via LPC bus 251 to the I/O devices such as the keyboard 121, the mouse 122, and the miscellaneous I/O device 123.

Figure 4:
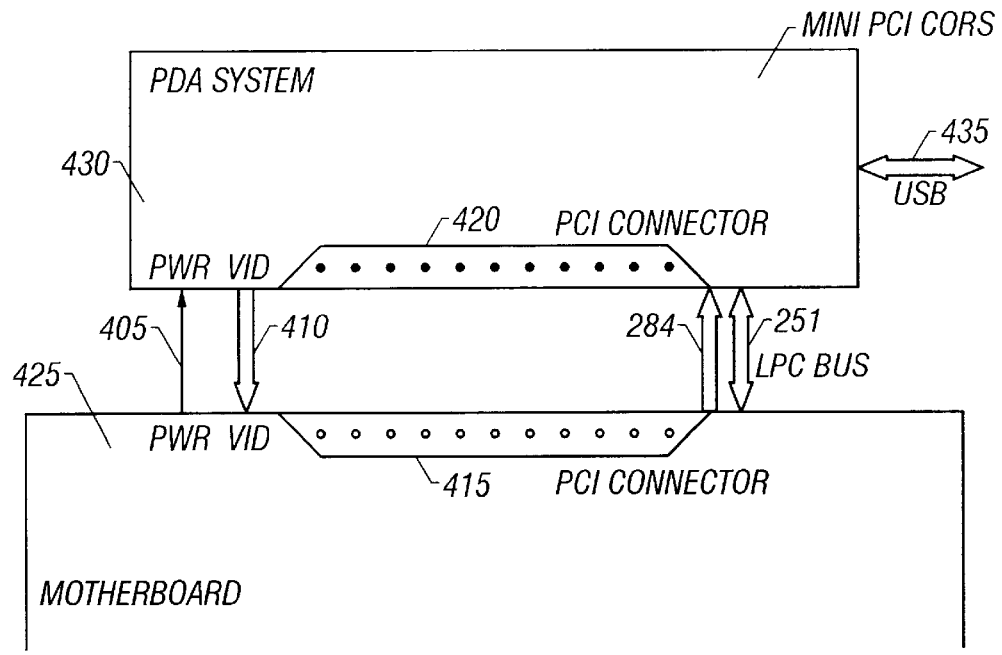
FIG. 4 illustrates the interface of a PDA system mini-PCI card to the system board.

Now referring to FIG. 4, illustrated is the interface of a PDA system mini-PCI card 430 to the mobile PC system motherboard 425. On current mobile PC systems there is a expansion provision to accept mini PCI cards. In one embodiment it is contemplated that the PDA system 110 will be integrated into a PCI or mini PCI card 430. Although the PCI bus interface is not expected to provide logical or functional connection, the PCI bus interface provides structural connection of the mini PCI card 430 to the system motherboard 425. The mini PCI card 430 has a connector 420 that is mated to a connector 415. It is contemplated that the PDA and PC share common power supply. The power supply is either an alternating current source or a battery supply. A power connection 405 from the system board 425 is provided assuring continuous power to the mini PCI card 430. A video bus 410 connects to the system board 425 providing video output that will be ultimately received by the common display 115. The LPC bus 251 directly connects from the mini PCI card 430 to the system board 425. From the mini PCI card 430, peripheral busses such as a universal serial bus (USB) 435 and other busses 436 can extend out. Placing the PDA system on a mini PCI board addresses current manufacturing and integration concerns, however, it is also contemplated that the PDA system may also be placed as part of the system board 425. It is also possible that other physical integration of the systems is possible, including placing the entire system, including the systems on an integrated circuit board.

Figure 5:
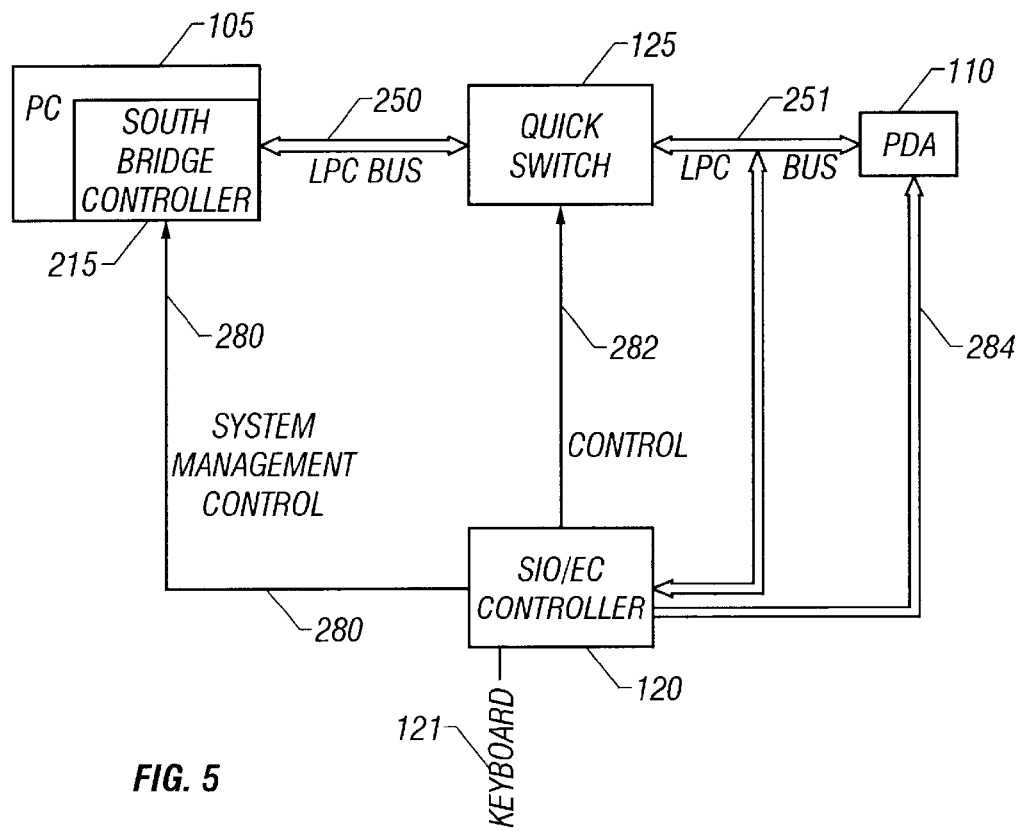
FIG. 5 illustrates the switching relationship between the PDA system to the PC system.

Now referring to FIG. 5 illustrated is the switching process of the computing system. The SIO/EC 120 is a controller that directs which system will have control. Possible controllers that can be used as SIO/EC 120 include the "MCS®51" series of controllers from the Intel Corporation. In addition to directing control, the SIO/EC 120 also acts as a save or transfer device between the two systems.

When the user desires to switch between systems, the PC system 105 or PDA system 110, whichever is currently in control, issues commands to the SIO/EC 120 to transition to the other system.

The SIO/EC 120 sends control signals 284 to the PDA 110 indicating whether control has passed to it or not. A similar system management control signal 280 is sent to the PC system 105 and received by the south-bridge controller 215. The system management control signal 280 informs the PC system 105 that the PC system 105 is in control. A control signal 282 indicating whether to block LPC Bus 250 is sent by the SIO/EC 120 to the quick switch 125.

The quick switch 125 either allows data to pass from LPC bus 250 to LPC bus 251 when the PC system 105 is in control, or will block data allowing only data to pass along LPC bus 251 when the PDA system 110 is in control. The quick switch 125 isolates LPC 250. In very low power state or "off" state, there is no power to the south-bridge controller 215. Since it is contemplated that the PDA system 110 will always have power, a typical scenario is to have the computing system come up operating under the PDA system 110. The actual power on scenario is user selectable.

The following "C" code illustrates switching control. The SIO/EC 120 contains instruction code in memory as to switching control.

The following code places the PDA system in control:

```
void make_PDA_Master()
{
    stop_lpc_bus();         //See routine below
    MASTER_PDA();           //   Control the quick switch
    nPDA_to_be_Master = 0;  // Start the clock from the PDA
                            system
    start_lpc_bus();        //See routine below
    usec(1);
    PDA_is_Master = 1;      // Signal that the PDA has full control
    PC_owns_VID = 0; PDA_owns_VID = 1; //Control the video
    MUX
}
```

The following code places the PC system in control:

```
void make_PC_Master()
{
    stop_lpc_bus();         //See routine below
    nPDA_to_be_Master = 1;  // Stop the clock
    MASTER_PC();            // Connect back to PC
    start_lpc_bus();        //See routine below
    usec(1);
    PDA_is_Master = 0;
    PC_owns_VID = 1; PDA owns_VID = 0;
}
```

The following is a "called" routine that stops the LPC Bus:

```
void stop_lpc_bus()
{
    nLPCPD = 0;             // LPC Power Down
    usec(30);
    nLRST = 0;              // LPC Reset
}
```

The following is a "called" routine that starts the LPC Bus:

```
void start_lpc_bus()
{
    usec(100);
    nLPCPD = 1;
    usec(60);
    nLRST = 1;
}
```

2. Operation of the Preferred Embodiments

The PDA system and the PC system use different user screen interfaces in order to eliminate user confusion. The following reduced menu may be made available by the PDA system.

```
Calendar Viewing
Address/rolodex
Email viewing
Limited File viewing
Event Alarm
System Status
```

It is contemplated that soft-key functions will be used by the system. In PDA system mode, the following soft-key options may be made available.

---
Display Calendar
Display Email
Display Phone List
Enter PC system
---

An embodiment of the disclosure involves an "instant-on" feature in which the computing system comes up in PDA system mode. Since there is continuous power to the PDA system and because the PDA system loads up from a flash memory, the operator sees an almost immediate interface to the computer system or an "instant-on." This "instant-on" scenario takes place upon power on or when the computer system comes up from a suspend state.

While the PDA system is in control, the PC system boots up and is made available. The soft-key option to enter into the PC system mode is available to the operator. Because it takes a relatively long time for the PC system to boot up compared to the PDA system, the user can make use of key functions provided by the PDA system and then switch to the PC system when expanded features of the PC system are needed.

Starting up and staying in PDA system mode allows reduced battery consumption, since the PDA system consumes less power than the PC system. At times the computing system will be in battery mode, and in order to conserve battery power, it may be desirable to have the computing system start up in PDA system mode. Therefore in this scenario under battery operation, system start-up will begin in PDA system mode.

Current mobile PC systems allow the following. When a mobile computing system is left running and its lid is closed, it is placed in a suspend state, the computing system entering a low power or sleep state. When the lid is opened the system returns to the previous mode, either PDA or PC. In an embodiment of the disclosure, in order to conserve battery power, if the system is in direct current (DC) or battery mode, the system boots from the PDA system showing an "instant-on" interface to the user. If the system is running on alternating current (AC) when the user activates power, the system starts up or boots from the PC system. This arrangement is directed to power conservation, directing control to the reduced power PDA system when battery mode is the default. If the system is under AC power, power conservation is not a concern. Therefore the system can direct control to the PC system when the system is coming up from a suspend state while in AC power.

Other variations of start-up or boot from the PDA system operating mode or the PC system operating mode are possible depending on user selection. It is contemplated that the SIO/EC will be programmable to control start up or return from suspend from either the PDA system or the PC system.

Once again referring to FIG. 5, the SIO/EC 120 is functionally connected to the user "on-screen" interface, and physically connected to the keyboard. A user has the ability to instruct the SIO/EC 120 by way of an icon on the "on-screen" interface to switch from one system to the other. Or the user may press a button on the keyboard 121 to request the change.

Although the SIO/EC 120 directs control of which system, PC system 105 or PDA system 110, has control over the computing system, the SIO/EC 120 is considered a "slave" to the system in control. The system in control being the "master." The "master" directs the SIO/EC 120 to make a change, only after the "master" has completed any tasks it needs to complete prior to passing control to the other system. The SIO/EC 120 does not begin any transition until given the instruction by the "master."

If a transition is being made from PC system 105 to PDA system 110, the software drivers on the PC system 105 will synchronize the data from its storage media to the PDA system 110 with the PDA system 110 operating as a slave device. The user has configuration control over what data is to be synchronized between the PC system 105 and PDA system 110.

The current "master" system will flush its current operation and begin to place itself in a state to be shutdown. When the current "master" system is done with what it is doing, the SIO/EC 120 is informed via the LPC busses, LPC 251 if the PDA system 110 is current "master," and LPC bus 250 and LPC bus 251, if PC system 105 is current "master."

After the SIO/EC 120 is informed that the current "master" has completed what it has needed to complete, the quick switch 125 is informed to allow communication to pass along LPC bus 250 and LPC bus 251 if the PC system 105 is in the new "master" in control. The quick switch 125 will block LPC bus 251 if the PDA system 110 is to be the new "master."

This process allows the SIO/EC 120 to activate the quick switch 125 to make the change; the SIO/EC 120 to control the system video controllers; and the SIO/EC 120 to inform the new "master" that it is time to complete the transition. Once the SIO/EC 120 has completed sending the control signals, the new "master" system will access the SIO/EC 120 and begin communicating to the SIO/EC 120 informing the SIO/EC that it is the new "master."

In the event a transition is made from the PDA system 110 to the PC system 105, the software drivers on the PC system 105 will access the PDA system 110 as a slave device and synchronize data from the PDA system 110 memory to the PC system 105 storage.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the disclosure. Variations and modifications of the embodiments disclosed herein may be made based on the description set forth herein, without departing from the spirit and scope of the disclosure as set forth in the following claims.

What is claimed:

1. A mobile computing system comprising:

a personal computer architecture system (PC);

a personal digital assistant architecture system (PDA);

a switch;

a controller;

a first communication bus connecting the controller to the switch and the PDA;

a second communication bus connecting the PC to the switch and to the first communication bus;

a common display interfacing to the PC and the PDA;

a set of common resource devices connected to controller whereby the controller selectively passes control of the common display and the set of common resource devices to the PDA or the PC by controlling the switch;

in response to the PDA system being given control, the second communication bus is blocked allowing the PDA system control over the common resource devices and the common display; and in response to the PC system being given control, the PDA system becomes a slave resource of the PC system and the PC system is given control over the common resource devices and the common display.

2. The mobile computing system of claim 1 further comprising:

a common power supply shared by the PC and the PDA.

3. The mobile computing system of claim 1 wherein the first communication bus and the second communication bus are low pin count (LPC) busses.

4. The mobile computing system of claim 1 wherein the PC is comprised of:

a central processing unit (CPU);

a north-bridge controller interfacing to the CPU; and a south-bridge controller interfacing to the north-bridge controller.

5. The mobile computing system of claim 1 wherein the PDA is comprised of:

a central processing unit (CPU);

a companion input output application specific integrated circuit (ASIC) interfacing to the CPU.

6. The mobile computing system of claim 1 further comprising:

a variable power supply whereby a lower power state of the mobile computing system is achieved when the PDA is in control of the common display and the set of common resource devices.

7. The mobile computing system of claim 1 wherein the PDA controls the common display and the set of common resource devices upon start up of the mobile computing system by default.

8. The mobile computing system of claim 1 wherein a user is able to select whether the PDA or the PC controls the common display and the set of common resource devices.

9. The mobile computing system of claim 1 further comprising:

a dedicated memory for the PC; and a dedicated memory for the PDA.

10. The mobile computing system of claim 4 further comprising:

a dedicated memory for the PC, and a memory system bus connecting the north-bridge controller to the dedicated memory.

11. The mobile computing system of claim 5 further comprising:

a dedicated memory for the PDA, and a memory system bus connecting the ASIC to the dedicated memory.

12. The mobile computing system of claim 11 further comprising:

a flash basic input output system (BIOS) device.

13. The mobile computing system of claim 9 wherein the dedicated memory for the PDA further comprises:

a flash memory.

14. The mobile computing system of claim 1 further comprising:

a video controller section for the PC interfacing to the common display; and a video controller section for the PDA interfacing to the common display.

15. The mobile computing system of claim 1 further comprising:

a common bus to the PC and the PDA, wherein the common bus may be controlled by the PC or the PDA.

16. The mobile computing system of claim 1 wherein the controller transfers data between the PC and PDA.

17. The mobile computing system of claim 1 further comprising:

an alternating current (AC) source; and a direct current (DC) source, whereby upon return from a system suspend state the PDA controls the common display and the set of common resource devices when the mobile computing system is operating under the DC source by default.

18. The mobile computing system of claim 1 further comprising:

an alternating current (AC) source; and a direct current (DC) source, whereby upon return from a system suspend state the PC controls the common display and the set of common resource devices when the mobile computing system is operating under the AC source by default.

19. The mobile computing system of claim 1 wherein the PDA is placed on a mini-PCI card and connected by PCI connectors to a system motherboard of the mobile computing system.

20. The mobile computing system of claim 1 wherein the PC and the PDA reside on a single computer board.

21. The mobile computing system of claim 1 wherein the PC and the PDA reside on an integrated circuit.

* * * * *